(12) United States Patent
Hayashi

(10) Patent No.: US 6,861,814 B2
(45) Date of Patent: Mar. 1, 2005

(54) CONTROL PARAMETER AUTOMATIC ADJUSTMENT APPARATUS

(75) Inventor: Eiji Hayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 117 days.

(21) Appl. No.: 10/247,516

(22) Filed: Sep. 20, 2002

(65) Prior Publication Data

US 2003/0201745 A1 Oct. 30, 2003

(30) Foreign Application Priority Data

Apr. 25, 2002 (JP) ........................................ 2002-124496

(51) Int. Cl.⁷ .............................................. G05B 13/00
(52) U.S. Cl. .................. 318/561; 318/568.23; 318/560; 318/567; 318/565; 318/646
(58) Field of Search ................................ 318/560, 561, 318/567, 568.1, 568, 23, 632, 565, 646, 600, 601–605; 702/56, 64, 65, 94

(56) References Cited

U.S. PATENT DOCUMENTS

| | | | | |
|---|---|---|---|---|
| 5,067,099 A | * | 11/1991 | McCown et al. | ........... 702/183 |
| 5,285,378 A | | 2/1994 | Matsumoto | |
| 5,313,403 A | * | 5/1994 | Fujita et al. | ................. 700/184 |
| 5,645,111 A | * | 7/1997 | Lindblom | ................... 139/55.1 |
| 5,656,906 A | | 8/1997 | Iwashita et al. | |
| 6,566,836 B2 | * | 5/2003 | Matsubara et al. | ......... 318/600 |
| 6,658,370 B2 | * | 12/2003 | Christ et al. | ................. 702/182 |
| 2003/0003315 A1 | * | 1/2003 | Yutkowitz | ................... 702/105 |

FOREIGN PATENT DOCUMENTS

| | | |
|---|---|---|
| JP | 4-302306 | 10/1992 |
| JP | 5-19858 | 1/1993 |
| JP | 8-221132 | 8/1996 |

* cited by examiner

*Primary Examiner*—Rita Leykin
(74) *Attorney, Agent, or Firm*—Leydig, Voit & Mayer, Ltd.

(57) ABSTRACT

A control parameter automatic adjustment apparatus acquires a movable range of a drive shaft of a drive system, and automatically generates a test movement program to automatically adjust a control parameter to the drive system even though the movable range changes.

8 Claims, 11 Drawing Sheets

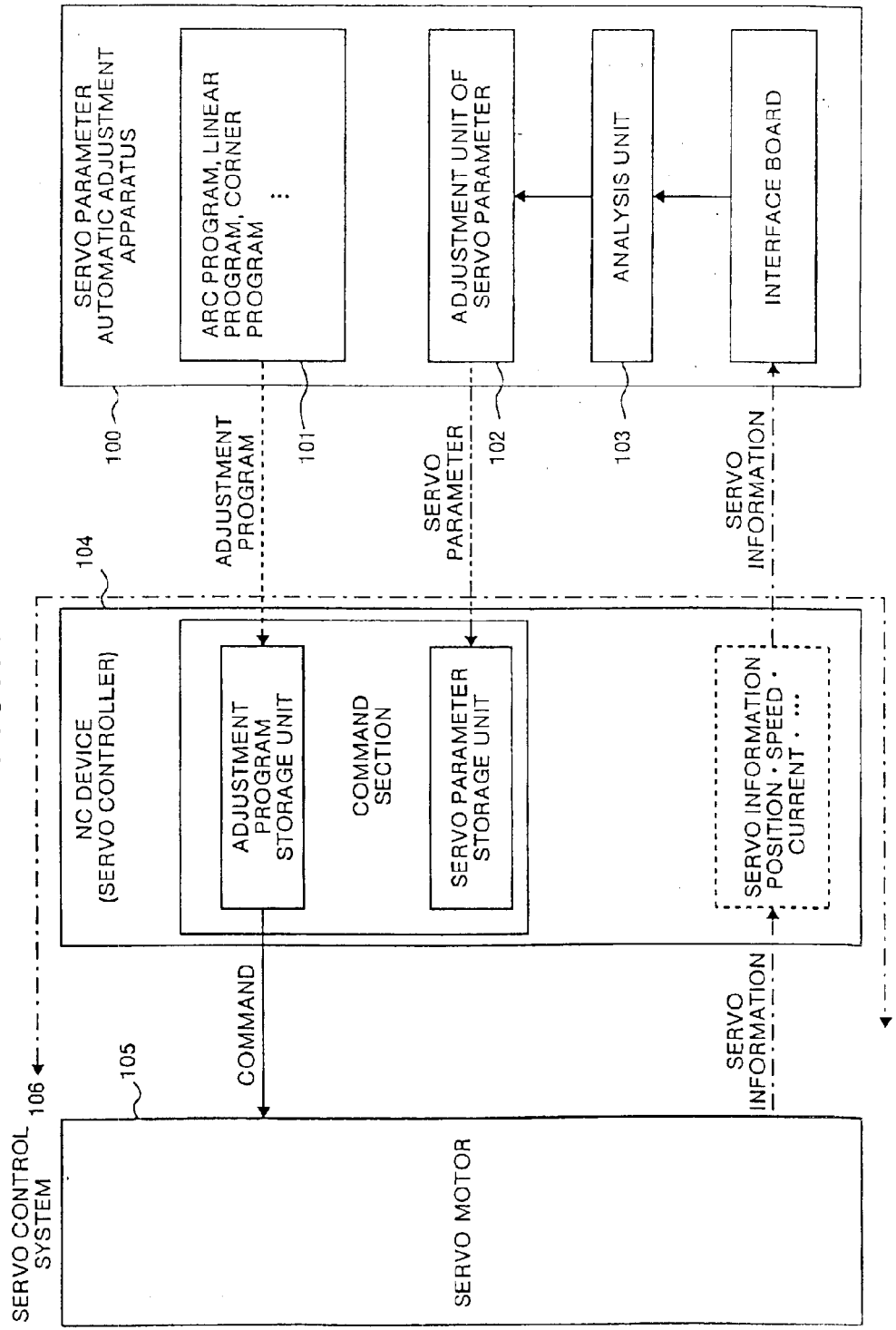

CONTROL PARAMETER AUTOMATIC ADJUSTMENT APPARATUS

BACKGROUND OF THE INVENTION

1) Field of the Invention

The present invention relates to a control parameter automatic adjustment apparatus capable of automatically adjusting a control parameter even though a physical parameter of a target system changes.

2) Description of the Related Art

FIG. 11 shows a servo parameter automatic adjustment apparatus which is disclosed in a conventional art (Japanese Patent Application Laid-Open No. H8-221132). In FIG. 11, a servo parameter automatic adjustment apparatus 100 has an adjustment program storage unit 101, a servo parameter adjustment unit 102, an analysis unit 103, and the like. Of these components, the adjustment program storage unit 101 which stores an adjustment program for causing a servo control system 106 constituted by a servo controller (NC device) 104 and a servo motor 105 to perform a predetermined operation such that the adjustment program storage unit 101 can transmit the adjustment program to the servo control system 106. The servo parameter adjustment unit 102 calculates a servo parameter of the servo control system 106 based on an analysis result of the analysis unit 103, and transmits the servo parameter to the servo control system 106. The analysis unit 103 analyzes servo information of the servo control system 106 driven by the adjustment program. Here, a servo parameter of the servo control system 106 is calculated based on an analysis result of the servo information for the servo control system 106 driven by the adjustment program, and the parameter is transmitted to the servo control system 106 to automatically adjust the servo parameter.

However, the adjustment program allows the control system to perform only a predetermined operation. Therefore, when a physical parameter of a drive system to be adjusted, e.g., the stroke of a shaft or the size of a load change, in other words, when a target mechanical configuration changes, the adjustment program must be reformed again by a person to adjust a servo parameter.

SUMMARY OF THE INVENTION

It is an object of the present invention to provide a control parameter automatic adjustment apparatus which acquires physical information of a target system as a parameter and automatically generates a test movement program to automatically adjust the control parameter even though the mechanical configuration of the target system changes to another one.

The control parameter automatic adjustment apparatus according to the present invention adjusts a control parameter of a servo system which includes a drive system and a controller for controlling the drive system. The apparatus comprises a parameter acquisition unit which acquires a parameter of the drive system, and a test movement program generator which generates a test movement program according to the parameter of the drive system obtained by the parameter acquisition unit. The apparatus also comprises an operation data acquisition unit which acquires data, as response data, on how the drive system is operating based on the test movement program, an operation data analyzer which analyzes the data obtained by the operation data acquisition unit, and a parameter adjuster which adjusts the parameter of the controller based on a result of the analysis obtained by the operation data analyzer.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 11 is a block diagram which shows an entire configuration of a prior art.

DETAILED DESCRIPTION

Embodiments of the present invention will be explained below with reference to the accompanying drawings.

Figure 1:
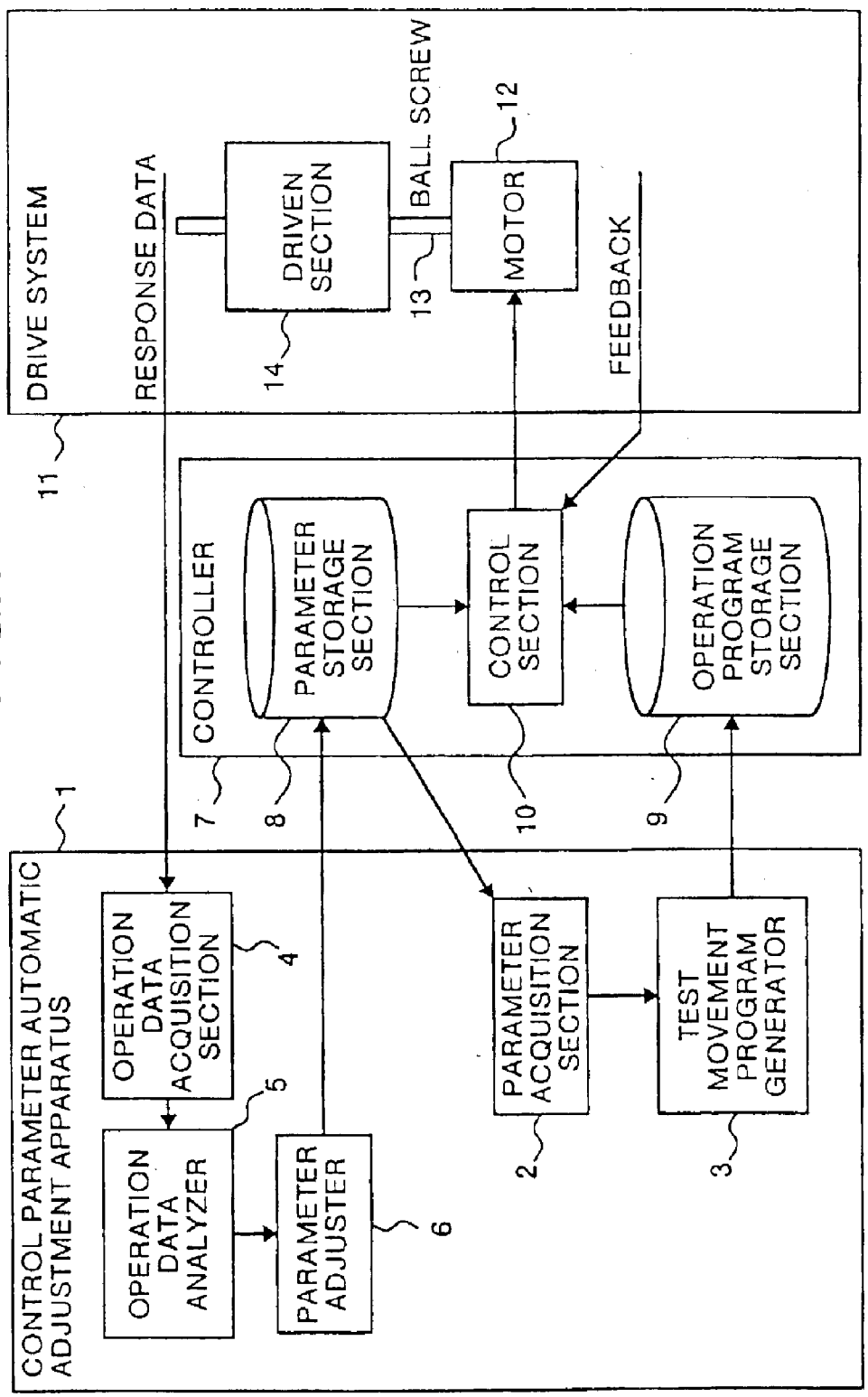
FIG. 1 is a block diagram which shows an entire configuration of a first embodiment of the present invention.

A first embodiment of this invention will be explained below. FIG. 1 is a block diagram which shows a control parameter automatic adjustment apparatus according to the first embodiment. FIG. 1 includes a control parameter automatic adjustment apparatus 1, a controller 7, and a drive system 11.

The control parameter automatic adjustment apparatus 1 includes a parameter acquisition section 2 which acquires a movable range of a driven section 14 from a parameter storage section 8 of the controller 7, a test movement program generator 3 which generates a test movement program based on the movable range of the driven section 14 acquired by the parameter acquisition section 2, an operation data acquisition section 4 which gives the test movement program to the controller 7 to acquire time series data such as a position, a speed, and a current of the drive system 11 at the time when the drive system 11 is operated, an operation data analyzer 5 which analyzes the time series data obtained by the operation data acquisition section 4, and a parameter adjuster 6 which adjusts a parameter in the controller 7 based on the analysis result obtained by the operation data analyzer 5. In this case, the control parameter automatic adjustment apparatus 1 operates only when the parameter in the controller 7 is adjusted, and does not operate in a normal movement.

The controller 7 controls the drive system 11 according to the given operation program, and includes a parameter storage section 8 which stores a physical parameter and a control parameter therein, an operation program storage section 9 which stores the operation program, and a control section 10 which performs feedback control with a motor 12 of the so-called drive system 11 according to the operation program. The control section 10 has a function which, when a parameter corresponding to a friction of the drive system 11 is given to the control section 10, reduces a tracking error to an operation program of the drive system 11 caused by the friction according to the parameter.

In addition, the drive system 11 is driven by a current output from the control section 10, and feeds back a position, a speed, and a current of the driven section 14 or data corresponding thereto to the control section 10. The drive system 11 includes the motor 12, a ball screw 13 driven by the motor 12, and a driven section 14 driven by the ball screw 13.

In this configuration, when the mechanical configuration of the target system changes, for example, when a movable range of the driven section 14 changes, the driven section 14 must be operated within the movable range to acquire operation data. For this purpose, a test movement program for the changed movable range is generated, and the motor 12 is driven by the control section 10 by using the program as an operation program. Operation data obtained by the operation performed by the new operation program is acquired and analyzed. Here, the operation data is adjusted and stored as a control parameter corresponding to friction.

Figure 2:
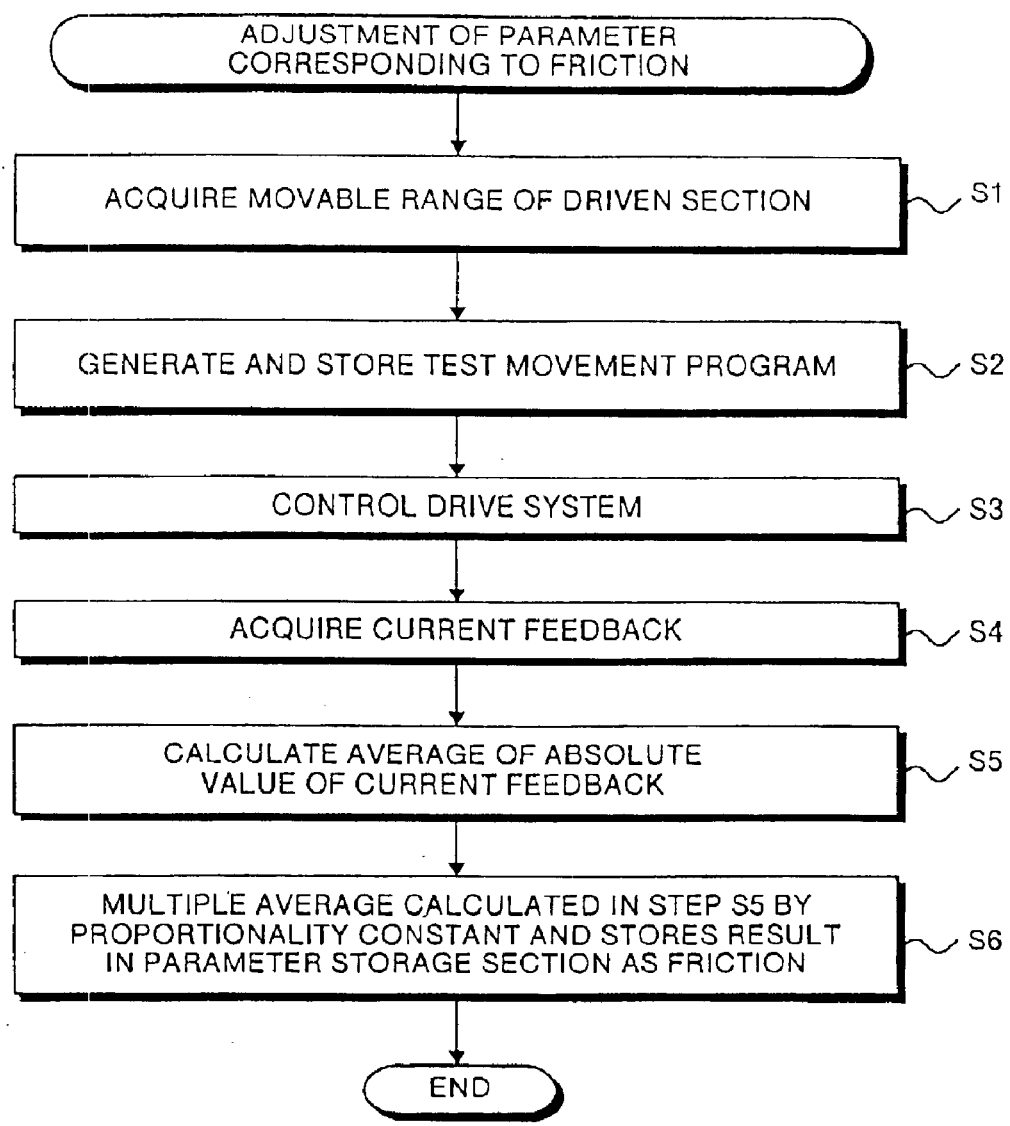
FIG. 2 is a flow chart which shows an operation of the configuration shown in FIG. 1.

An operation of the configuration shown in FIG. 1 will be described below. FIG. 2 shows a procedure for adjusting the parameter corresponding to the friction. In step S1, the parameter acquisition section 2 acquires a movable range of the driven section 14 from the parameter storage section 8. In step S2, the test movement program generator 3 generates a test movement program which reciprocally moves the driven section 14 at a predetermined speed between the lower limit position and the upper limit position in the movable range of the driven section 14 acquired in step S1, and stores the test movement program in the operation program storage section 9. In step S3, the control section 10 performs feedback control of the drive system 11 according to the test movement program stored in step S2. In step S4, the operation data acquisition section 4 acquires a value of current feedback when the driven section 14 is driven by the test movement program. In step S5, the operation data analyzer 5 calculates the average of the absolute values of current feedback values of the driven section 14 acquired in step S4. In step S6, the parameter adjuster 6 multiplies the average of the current feedback values calculated in step S5 by a proportionality constant to store the resultant value as friction in the parameter storage section 8.

In this manner, even though the movable range of the driven section 14 changes, the parameter can be acquired, so that a test movement program can be easily generated. In this state, the operation program is executed to acquire and analyze the operation data, so that the control parameter can be automatically adjusted.

Figure 3:
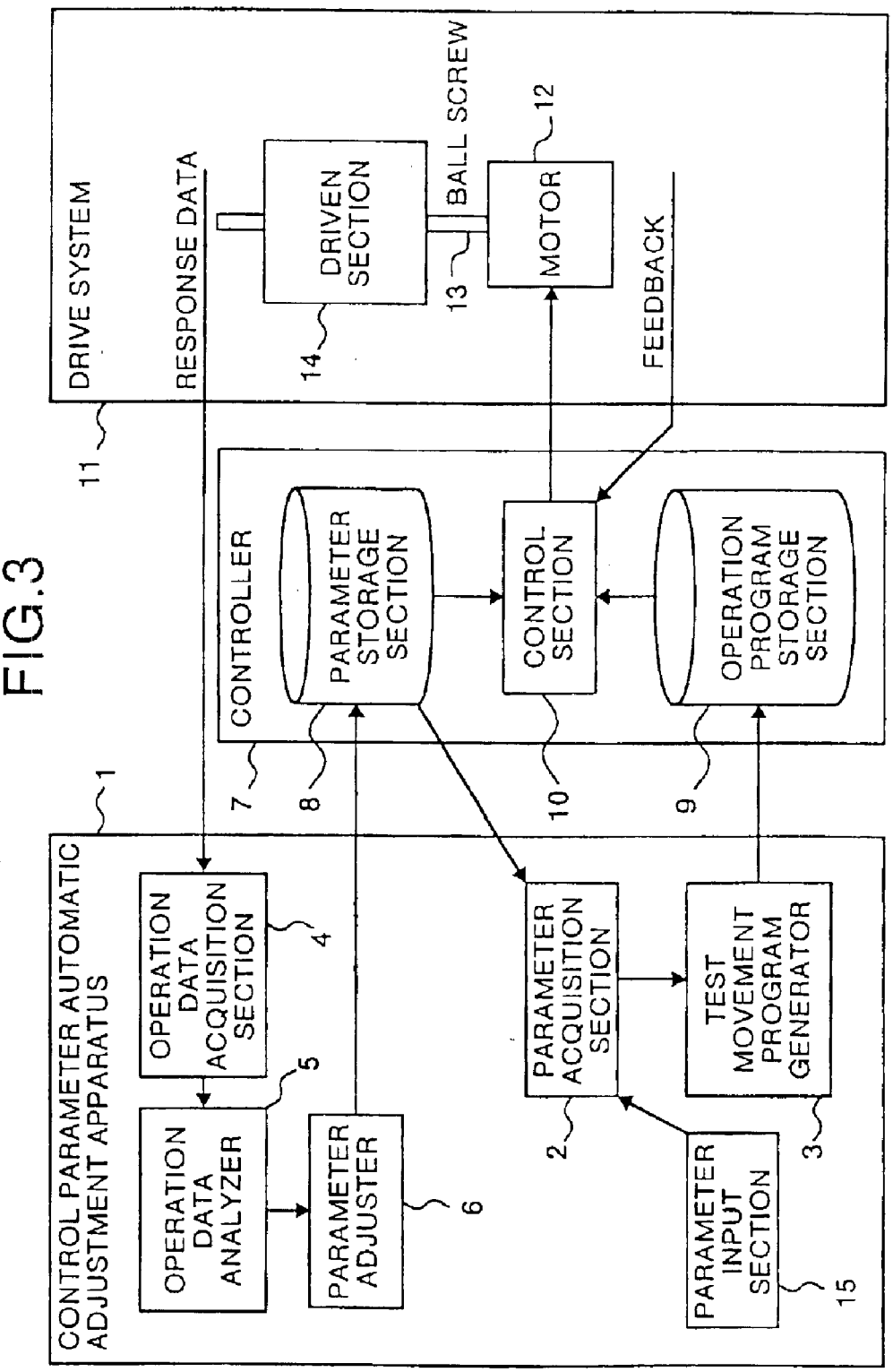
FIG. 3 is a block diagram which shows an entire configuration of a modification of the first embodiment.

FIG. 3 is a block diagram which shows a modification of the first embodiment. The configuration in FIG. 3 is almost the same as that in FIG. 1. The same reference numerals as in FIG. 1 denote the same parts in FIG. 3. The configuration in FIG. 3 is different from the configuration in FIG. 1 in that a parameter input section 15 which is used when a user inputs a movable range of a drive shaft as the driven section 14 is arranged in the control parameter automatic adjustment apparatus 1. Therefore, the movable range is input from the parameter input section 15 to the parameter acquisition section 2 but not input from the parameter storage section 8 as shown in FIG. 1. In the example shown in FIG. 3, a movable range is input by a person through the parameter input section 15, but this does not means that a program is reformed, as shown in an example of the conventional art of FIG. 11.

Figure 4:
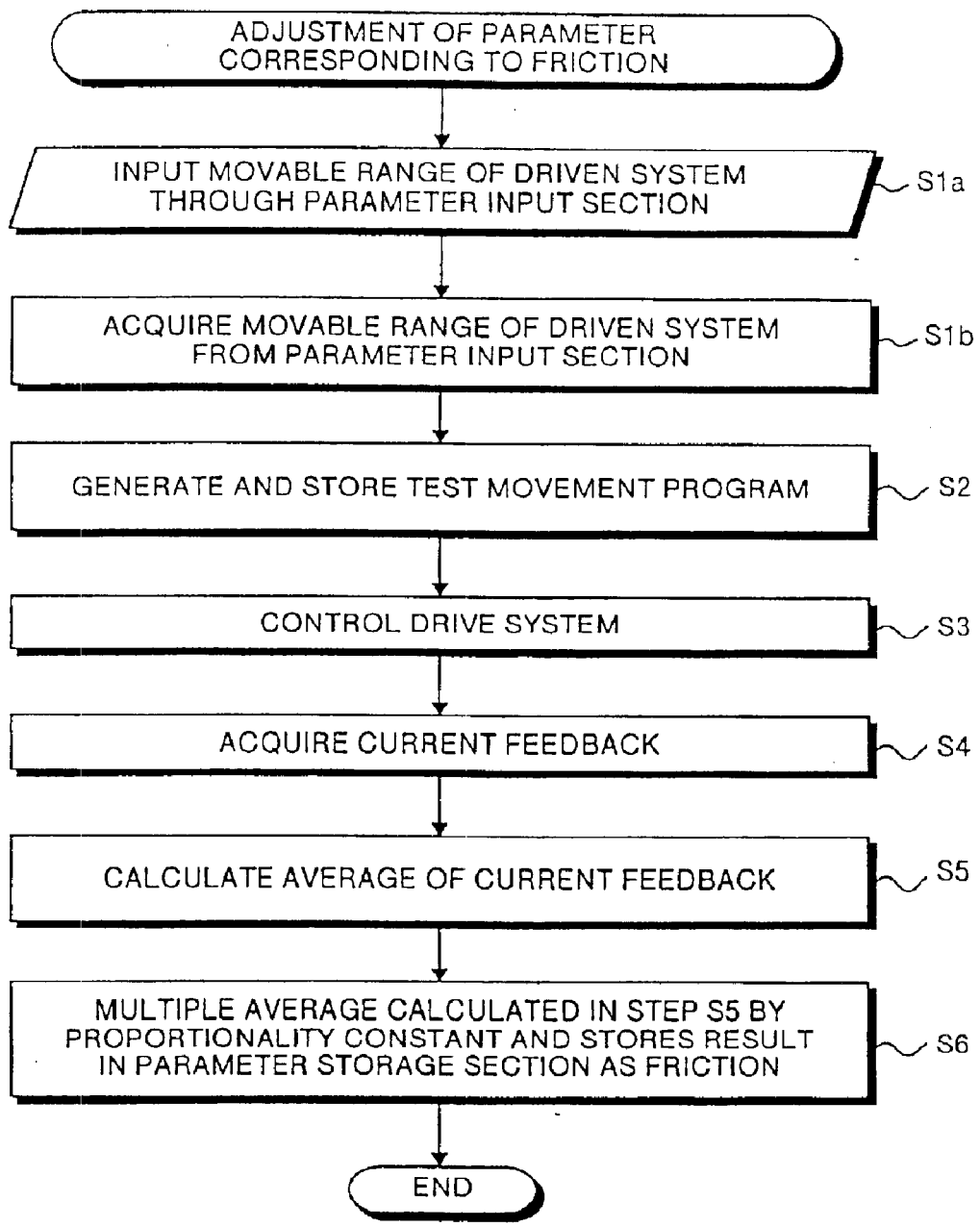
FIG. 4 is a flow chart which shows an operation of the configuration shown in FIG. 3.

A difference between an operation of the modification and the operation in FIG. 2 will be described below. FIG. 4 shows a procedure for adjusting a parameter corresponding to friction. In step S1a, a user inputs a movable range of the driven section 14 through the parameter input section 15. In step S1b, the parameter acquisition section 2 acquires the movable range of the driven section 14 input by the user in step S1a. In FIG. 4, the steps subsequent to step S2 are the same as those in FIG. 1.

With the configuration in FIG. 3, the movable range of the driven section 14 is input to acquire the parameter of the movable range, so that a test movement program can be easily generated. In this state, the operation program is executed to acquire and analyze operation data, so that a control parameter can be automatically adjusted.

Figure 5:
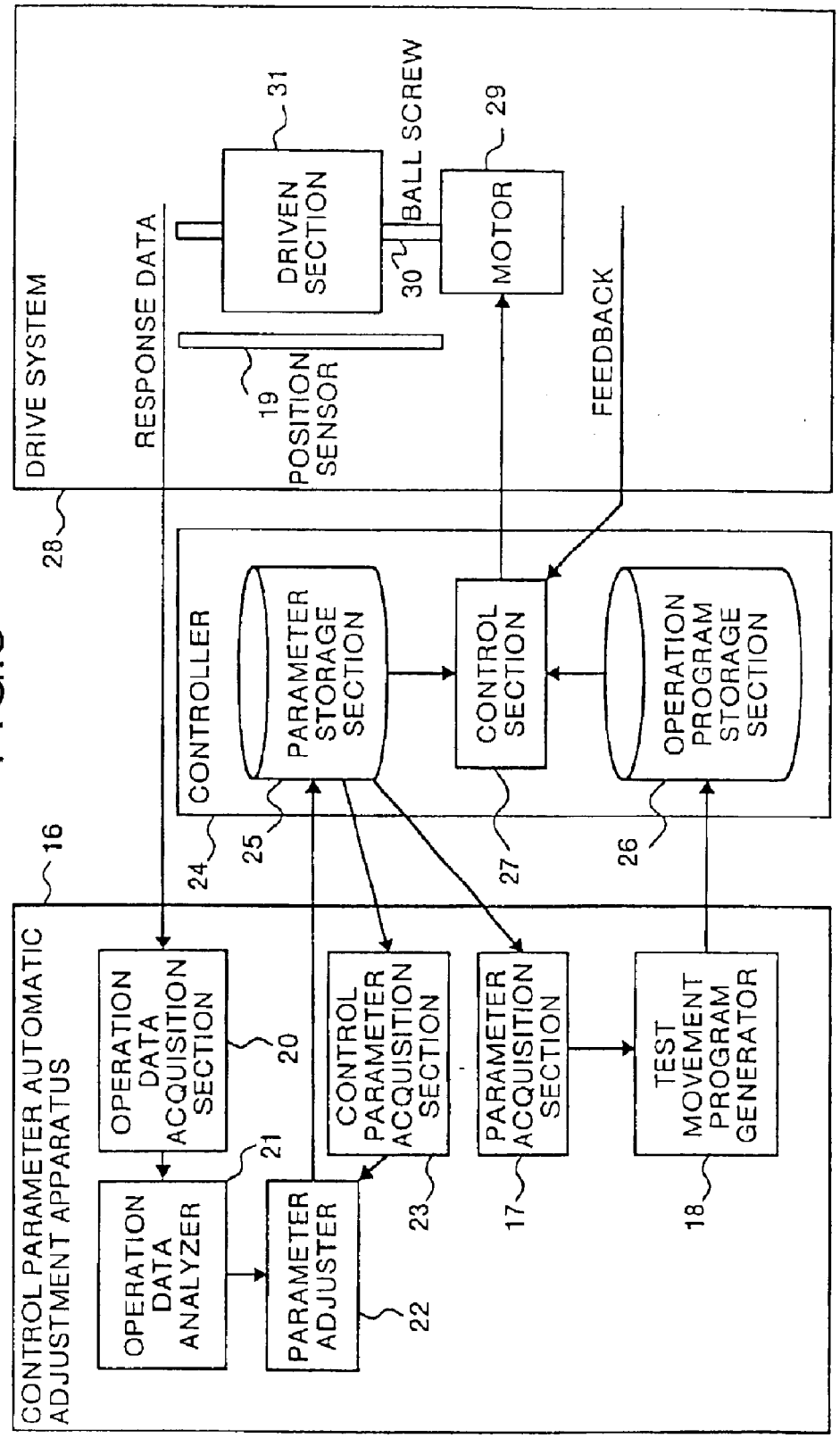
FIG. 5 is a block diagram which shows an entire configuration of a second embodiment of the present invention.

A second embodiment of this invention will be explained below. FIG. 5 is a block diagram which shows the configuration of a control parameter automatic adjustment apparatus according to the second embodiment.

The control parameter automatic adjustment apparatus 16 includes a parameter acquisition section 17 which acquires the mass of a driven section 31 accumulated in a parameter storage section 25 of a controller 24 in advance, a test movement program generator 18 which generates a test movement program based on the mass of the driven section 31 acquired by the parameter acquisition section 17, an operation data acquisition section 20 which acquires a position of a motor 29 obtained when a drive system 28 is operated, time series data of a current, and a position of the driven section 31 obtained by a position sensor 19 by giving the test movement program to the controller 24, an operation data analyzer 21 which analyzes the time series data obtained by the operation data acquisition section 20, a control parameter acquisition section 23 which acquires a parameter from the parameter storage section 25 of the controller 24, and a parameter adjuster 22 which adjusts a spring constant parameter in the parameter storage section 25 based on the parameter obtained by the control parameter acquisition section 23 and the analysis result obtained by the operation data analyzer 21.

The controller 24 controls the drive system 28 according to the given operation program. The controller 24 includes the parameter storage section 25 which stores parameters therein, an operation program storage section 26 which stores an operation program, and a control section 27 which performs a so-called feedback control according to the operation program.

The drive system 28 is driven by a current value output from the control section 27 and feeds back a position, a speed, and a current or data corresponding thereto to the control section 27. The drive system 28 includes the position sensor 19 which measures the position of the driven section 31.

The drive system 28 also includes the motor 29, a ball screw 30 driven by the motor 29, and the driven section 31 driven by the ball screw 30. In such a drive system 28, the ball screw is transformed by a force acting on the ball screw. Because of the transformation, a tracking error to a target position of the driven section 31 increases. The controller 24 includes a function which approximates the transformation with a simple spring and which estimates a quantity of transformation based on the given spring constant to reduce a tracking error. The control parameter automatic adjustment apparatus 16 and the position sensor 19 operate only when the parameter is adjusted, and therefore both the devices do not operate or are removed in a normal movement.

When a mechanical configuration of the target system changes in such a configuration, in other words, when the mass of the driven section 31 changes, it is necessary that the driven section 31 be moved by the mass to acquire operation data. In addition, transformation of the ball screw, i.e., a spring constant must be specified. Therefore, a test movement program is generated with respect to the changed mass, and the motor 29 is driven by the control section 27 by using the program as an operation program. Operation data obtained through a movement performed by the new operation program is acquired and analyzed, and the operation data is adjusted and stored as a control parameter corresponding to the spring constant.

Figure 6:
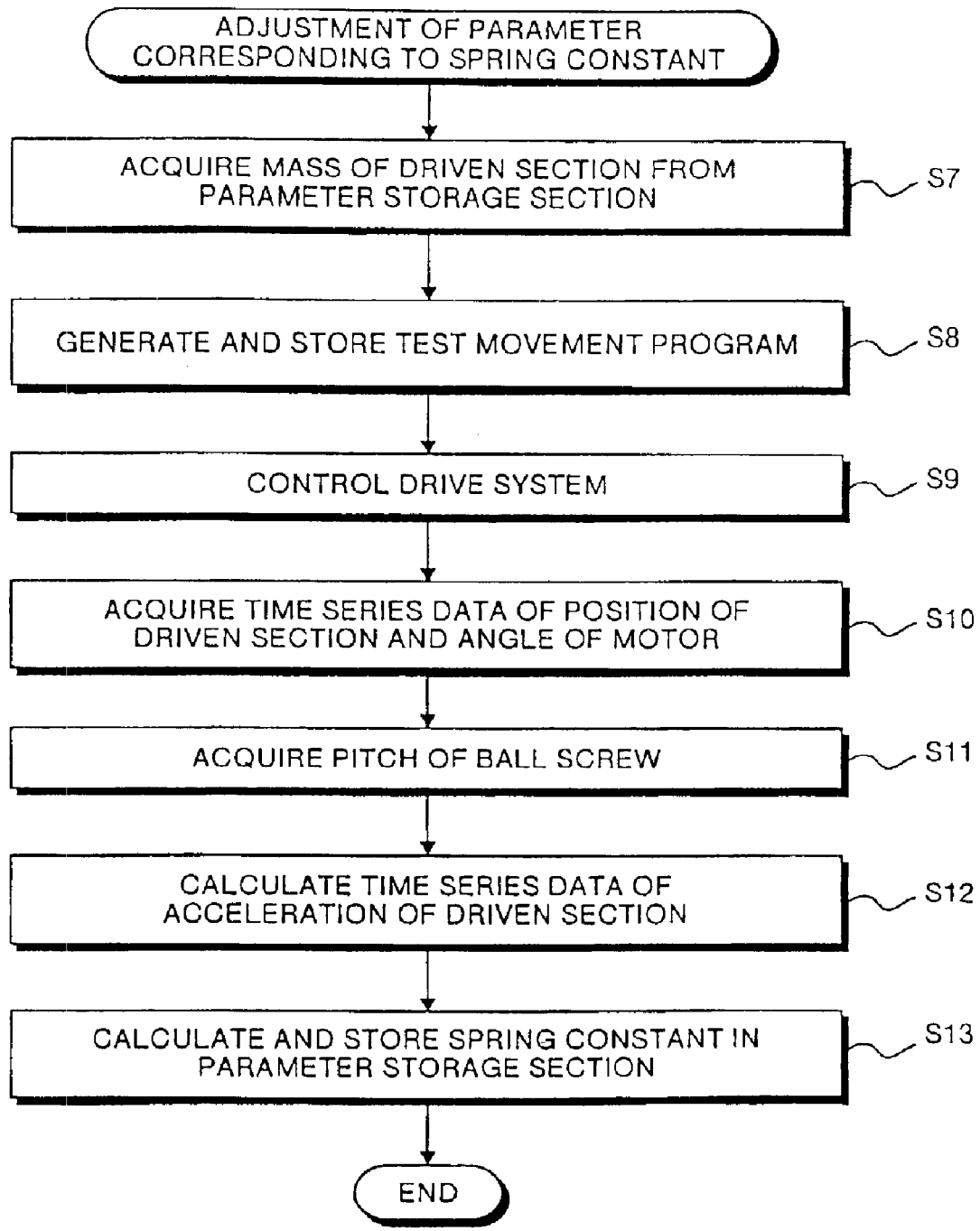
FIG. 6 is a flow chart which shows an operation of the configuration shown in FIG. 5.

An operation of the configuration shown in FIG. 5 will be described below. FIG. 6 shows a procedure for adjusting the spring constant. In step S7, the parameter acquisition section 17 acquires the mass of the driven section 31 stored in the parameter storage section 25 in the controller 24 in advance. In step S8, the test movement program generator 18 generates a program for causing the driven section 31 to perform a 1-cycle sinusoidal movement, and stores the generated test movement program in the operation program storage section 26. Here, the sinusoidal movement means that a movement is performed to obtain the maximum torque, i.e., the maximum transformation in a positive (+) direction with respect to the motor shaft and to obtain the maximum torque, i.e., the maximum transformation in a negative (−) direction. In this state, it is assumed that amplitude of the sine wave is represented by A, a frequency of the sine wave is represented by w, and the maximum torque of the motor 29 is converted into a force F acting on the driven section 31. The amplitude A and the frequency w are set to satisfy the following equation.

$$F = Aw^2$$

When these values are set, the torque of the motor 29 changes from the maximum value in the negative direction to the maximum value in the positive direction during the test movement.

In step S9, the control section 27 controls the drive system 28 according to the operation program stored in the operation program storage section 26. In step S10, the operation data acquisition section 20 acquires time series data pos(t) of a position of the driven section 31 in execution of the operation program from the position sensor 19, and, at the same time, acquires time series data ang(t) for an angle of the motor 29. In addition, in step S11, the control parameter acquisition section 23 acquires a pitch of the ball screw 30 from the parameter storage section 25.

In step S12, the operation data analyzer 21 calculates a second order difference of the time series data for the position of the driven section 31 acquired in step S10 to calculate time series data acc(t) of an acceleration for the driven section 31. It is assumed that time series data of a quantity of transformation of the ball screw 30 is represented by Δpos(t) and the pitch of the ball screw 30 is represented by PIT. In this state, the following equation is established.

$$\Delta pos(t) = pos(t) - PIT \times ang(t)$$

When this transformation is approximated with a simple spring, the following equation is established.

$$\Delta pos(t) = K \times acc(t)$$

where K is a spring constant.

According to the above equations, the following relational equation is obtained.

$$pos(t) - PIT \times arg(t) = K \times acc(t)$$

In step S12, a K which most accurately satisfies the above equation at each time of the time series data calculated in step S11 is calculated by using a least-squares method. In step S13, the spring constant K calculated in step S12 is stored in the parameter storage section 25.

In this manner, even though the mass of the driven section 31 changes, a test movement program can be easily generated by acquiring the parameter of the mass. In this state, the operation program is executed to acquire and analyze operation data, so that a control parameter corresponding to a spring constant can be automatically adjusted.

Figure 7:
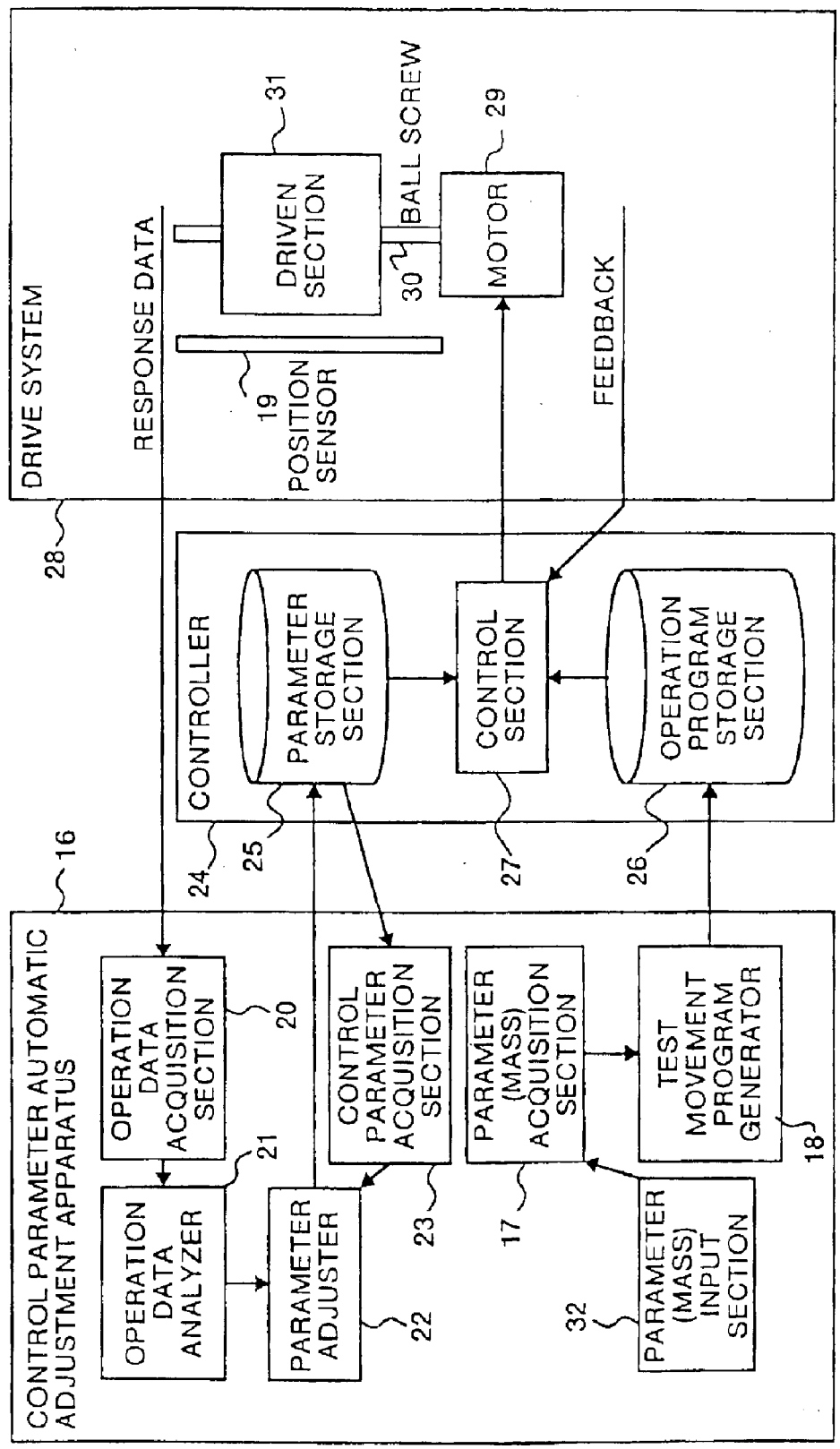
FIG. 7 is a block diagram which shows an entire configuration of a modification of the second embodiment.

FIG. 7 is a block diagram which shows a modification of the second embodiment. The configuration shown in FIG. 7 is almost the same as that in FIG. 5, and the same reference numerals as in FIG. 5 denote the same parts in FIG. 7. The configuration in FIG. 7 is different from the configuration in FIG. 5 in that the control parameter automatic adjustment apparatus 16 includes a parameter input section 32 which is used when a user inputs a mass of the driven section 31. Therefore, the mass is input from the parameter input section 32 to the parameter acquisition section 17 but not input from the parameter storage section 25 as shown in the configuration of FIG. 5. In the example in FIG. 7, the mass is input by a person through the parameter input section 32, but this does not means that the program is reformed, as shown in the example of the conventional art shown in FIG. 11.

Figure 8:
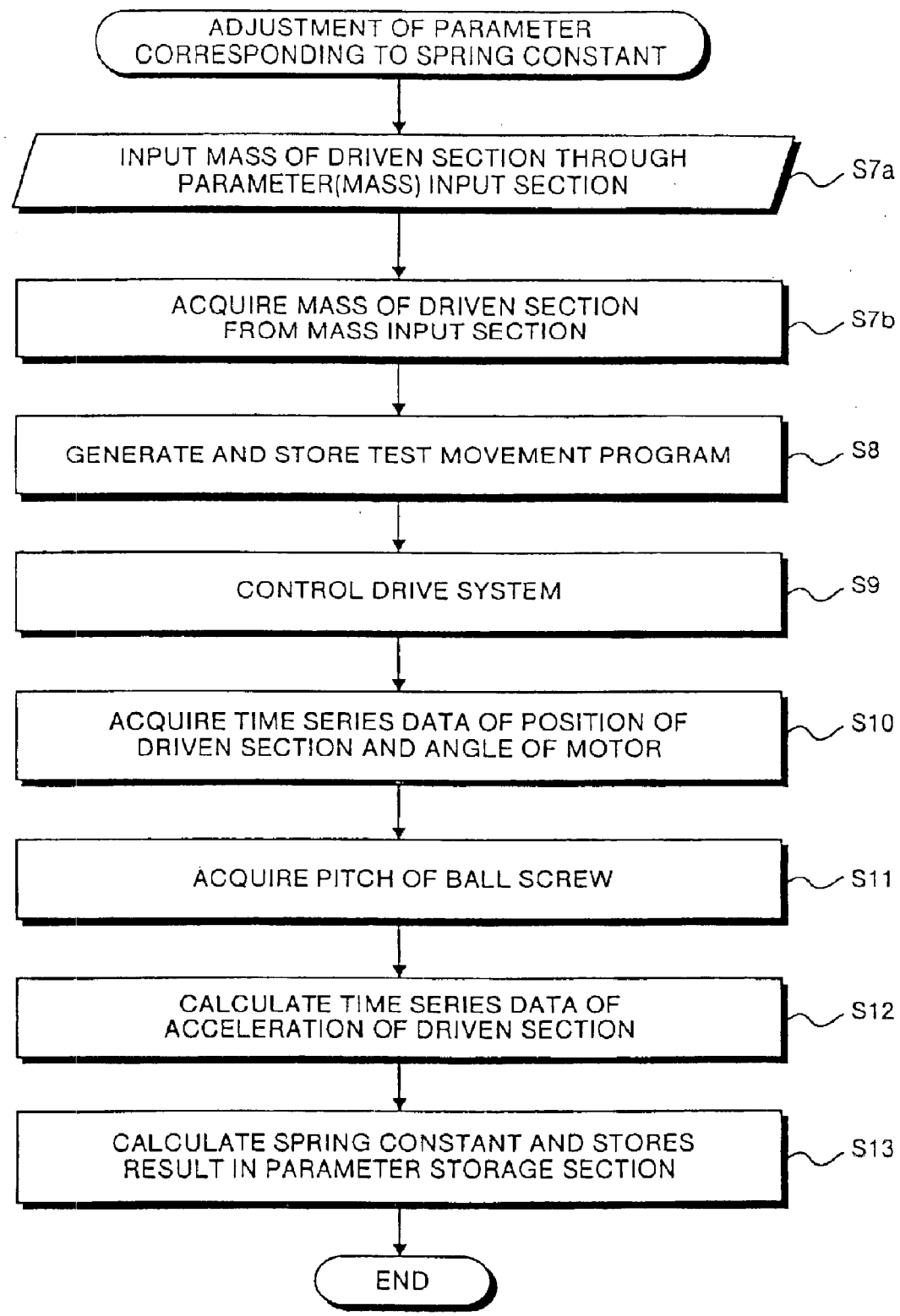
FIG. 8 is a flow chart which shows an operation of the configuration shown in FIG. 7.

A difference between the operation of this modification and the operation in FIG. 6 will be described below. FIG. 8 shows a procedure for adjusting a parameter corresponding to a spring constant. In step S7a, a user inputs a mass of the driven section 31 through the parameter input section 32 (a mass input section). In step S7b, the parameter acquisition section 17 (a mass acquisition section) acquires the mass of the driven section 31 input by the user in step S7a. The steps subsequent to step S8 in FIG. 8 are the same as those in FIG. 6.

Even executing the operation shown in FIG. 8, a test movement program can also be easily generated by inputting the mass of the driven section 31 to acquire the parameter of the mass. In this state, the operation program is executed to acquire and analyze operation data, and a control parameter can be automatically adjusted.

Figure 9:
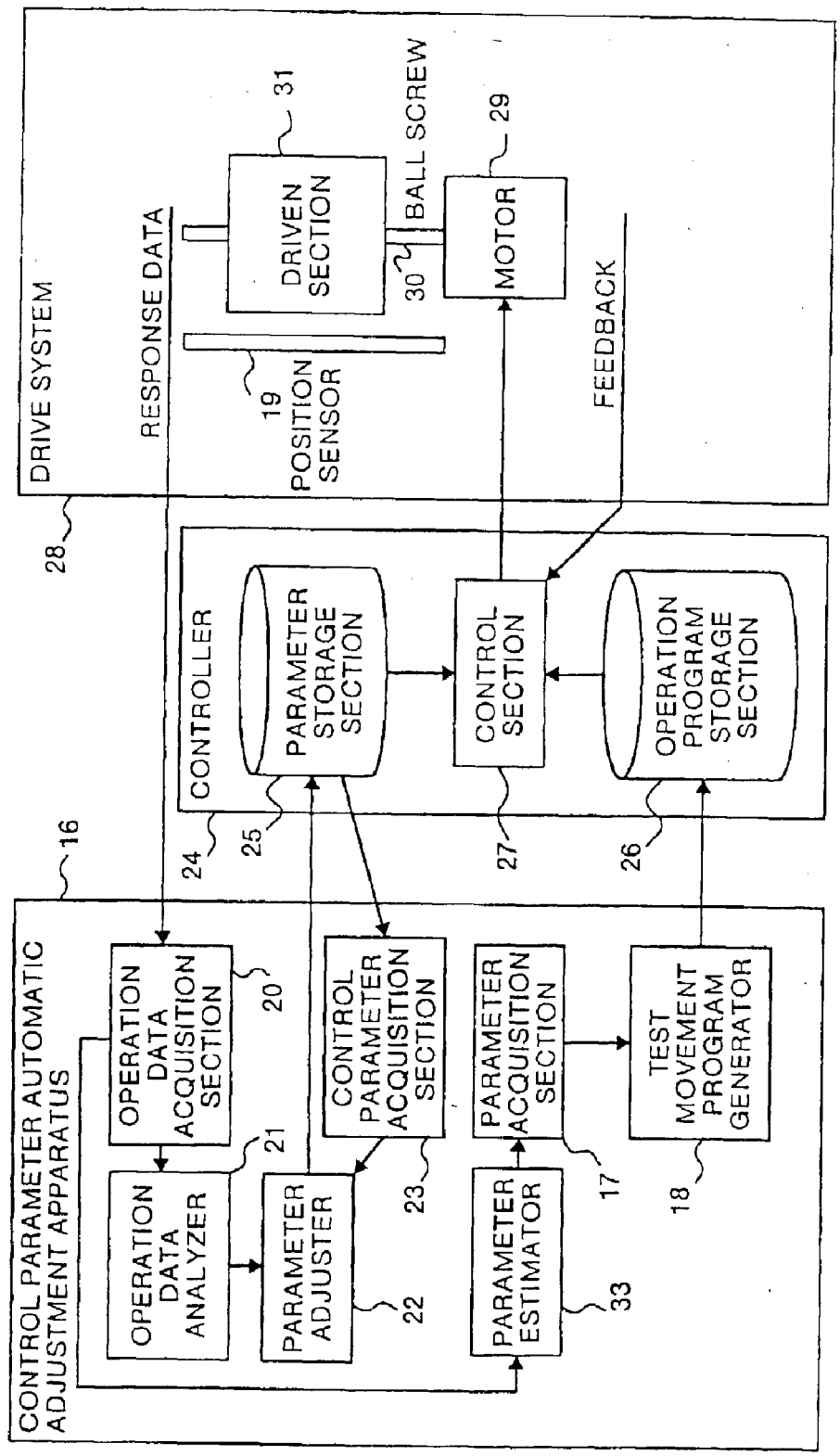
FIG. 9 is a block diagram which shows an entire configuration of a modification of the second embodiment.

FIG. 9 is a block diagram which shows still another modification of the second embodiment. The configuration in FIG. 9 is almost the same as that in FIG. 5, and the same reference numerals as in FIG. 5 denote the same parts in FIG. 9. The configuration in FIG. 9 is different from the configuration in FIG. 5 in that the control parameter automatic adjustment apparatus 16 includes a parameter estimator 33 which estimates a mass of the driven section 31 based on response data. Therefore, the estimated mass is input from the parameter estimator 33 to the parameter acquisition section 17. The mass is not input from the parameter storage section 25 to the parameter acquisition section 17 as shown in the configuration in FIG. 5, or the mass is not input from the parameter input section 32 to the parameter acquisition section 17 as shown in the configuration in FIG. 7. The response data is obtained from the operation data acquisition section 20 and the mass is obtained by the parameter estimator 33 and fetched in the parameter acquisition section 17.

Figure 10:
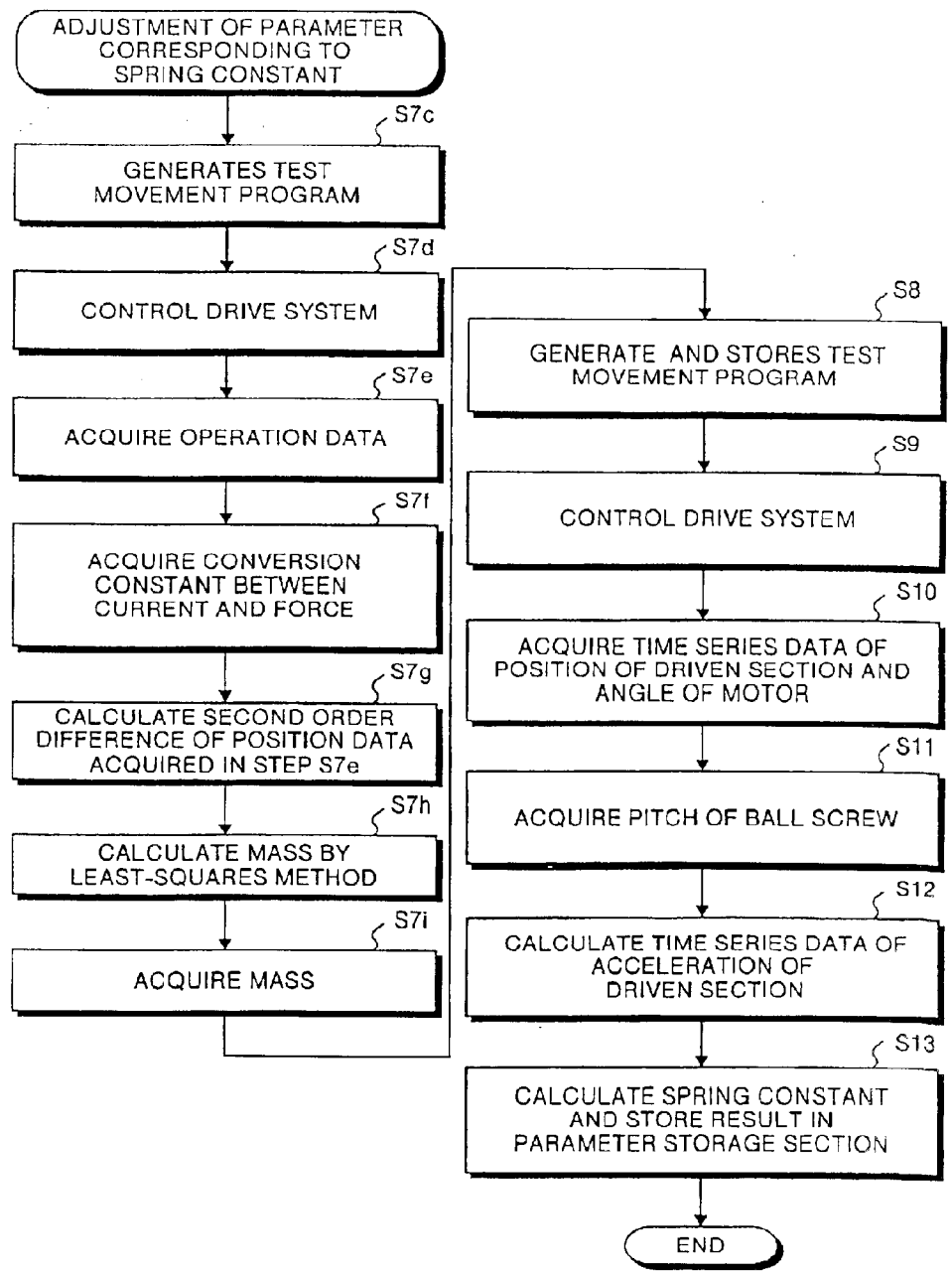
FIG. 10 is a flow chart which shows an operation of the configuration shown in FIG. 9.

An operation of the modification will be described below. FIG. 10 shows a procedure for adjusting a screw constant. In step S7c, the test movement program generator 18 generates a program for outputting a constant current to the motor 29 and stores the program in the operation program storage section 26. In step S7d, the control section 27 controls the motor 29 of the drive system 28 according to the operation program stored in the operation program storage section 26. In step S7e, the operation data acquisition section 20 acquires time series data pos(t) of a position of the driven section 31 in execution of the operation program from the position sensor 19. At the same time, a current value cur(t) of the motor 29 is acquired. In step S7f, the control parameter acquisition section 23 acquires a conversion constant $K_F$ between the current of the motor 29 and a force generated in the driven section 31 from the parameter storage section 25. In step S7g, the parameter estimator 33 calculates a second order difference of the time series data of the position of the driven section 31 to obtain time series data acc(t) for an acceleration of the driven section 31. It is assumed that the mass of the driven section 31 is represented by M. In this state, the following approximate expression is established.

$$M \times acc(t) = K_F \times cur(t)$$

In step S7h, the parameter estimator 33 calculates a mass M which most accurately satisfies the above expression by using the least-squares method. In step S7i, the parameter acquisition section 17 acquires the mass M calculated in step S7h from the parameter estimator 33. The steps subsequent to step S8 are the same as those in FIGS. 6 and 8.

Even executing the operation shown in FIGS. 9 and 10, a test movement program can also be easily generated by inputting the mass of the driven section 31 to acquire the parameter of the mass. In this state, the operation program is executed to acquire and analyze operation data, and a control parameter can be automatically adjusted.

As described above, according to the present invention, there is provided the control parameter automatic adjustment apparatus which adjusts a control parameter of the servo system which has the drive system and the controller which controls the drive system. The apparatus comprises the parameter acquisition section which acquires a parameter of a drive system, the test movement program generator which generates the test movement program according to the parameter of the drive system obtained by the parameter acquisition section, the operation data acquisition section which acquires data on how the drive system is operating based on the test movement program, the operation data analyzer which analyzes the data obtained by the operation data acquisition section, and the parameter adjuster which adjusts the parameter of the controller based on the analysis result obtained by the operation data analyzer. Therefore, even though the target mechanical configuration changes, the control parameter can be automatically adjusted by automatically generating the test movement program.

Furthermore, the parameter acquisition section acquires a parameter of the drive system from the controller. Therefore, even though the target mechanical configuration changes, the control parameter can be automatically adjusted by automatically generating the test movement program based on the parameter of the drive system acquired from the controller.

Moreover, the control parameter automatic adjustment apparatus further comprises the parameter input section which is used when the user inputs a parameter of the drive system. The parameter acquisition section acquires the parameter of the drive system from the parameter input section. Therefore, even though the target mechanical configuration changes, the control parameter can be automatically adjusted by automatically generating the test movement program based on the parameter acquired from the parameter input section.

Furthermore, the control parameter automatic adjustment apparatus further comprises the parameter estimator which estimates a parameter of the drive system based on response data from the drive system to the operation data acquisition unit, obtained from the operation data acquisition section. The parameter acquisition section acquires a parameter of the drive system through the parameter estimator. Therefore, even though the target mechanical configuration changes, the control parameter can be automatically adjusted by automatically generating the test movement program based on the parameter estimated according to the response data.

Moreover, a movable range of the drive shaft is acquired as a parameter of the drive system. Therefore, even though the movable range of the drive shaft changes, the control parameter can be automatically adjusted by automatically generating the test movement program.

Furthermore, a mass of the drive shaft is acquired as a parameter of the drive system. Therefore, even though the mass of the driven section changes, the control parameter can be automatically adjusted by automatically generating the test movement program.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A control parameter automatic adjustment apparatus which adjusts a control parameter of a servo system including a drive system and a controller for controlling the drive system, the control parameter automatic adjustment apparatus comprising:
    a parameter acquisition unit which acquires a movable range parameter of a drive shaft of the drive system;
    a test movement program generator which generates a test movement program based on the movable range parameter acquired;
    an operation data acquisition unit which acquires information on how the drive system is operating when the drive system is operated using the test movement program;
    an operation data analyzer which analyzes the information acquired; and
    a parameter adjuster which adjusts the control parameter of the servo system based on analysis by the operation data analyzer of the information acquired, wherein the control parameter is a friction parameter of the drive system.

2. The control parameter automatic adjustment apparatus according to claim 1, wherein the parameter acquisition unit acquires the parameter from the controller.

3. The control parameter automatic adjustment apparatus according to claim 1, further comprising a parameter input unit used by a user to input the parameter, wherein the parameter acquisition unit acquires the input parameter from the parameter input unit.

4. The control parameter automatic adjustment apparatus according to claim 1, wherein the information is response of the drive system, the control parameter automatic adjustment apparatus further comprising a parameter estimator which estimates the parameter based on the response, wherein the parameter acquisition unit acquires the parameter from the parameter estimator.

5. A control parameter automatic adjustment apparatus which adjusts a control parameter of a servo system including a drive system and a controller for controlling the drive system, the control parameter automatic adjustment apparatus comprising:

a parameter acquisition unit which acquires a mass parameter of a drive shaft of the drive system;

a test movement program generator which generates a test movement program based on the mass parameter acquired;

an operation data acquisition unit which acquires information on how the drive system is operating when the drive system is operated using the test movement program;

an operation data analyzer which analyzes the information acquired; and a parameter adjuster which adjusts the control parameter of the servo system based on analysis by the operation data analyzer of the information acquired, wherein the control parameter is a spring constant parameter of the drive system.

6. The control parameter automatic adjustment apparatus according to claim 5, wherein the parameter acquisition unit acquires the parameter from the controller.

7. The control parameter automatic adjustment apparatus according to claim 5, further comprising a parameter input unit used by a user to input the parameter, wherein the parameter acquisition unit acquires the input parameter from the parameter input unit.

8. The control parameter automatic adjustment apparatus according to claim 5, wherein the information is response of the drive system, the control parameter automatic adjustment apparatus further comprising a parameter estimator which estimates the parameter based on the response, wherein the parameter acquisition unit acquires the parameter from the parameter estimator.

* * * * *